United States Patent [19] [11] Patent Number: 5,055,344
Naraoka et al. [45] Date of Patent: Oct. 8, 1991

[54] MATERIAL FOR PACKAGING LIGHT-SENSITIVE MATERIALS

[75] Inventors: Naohito Naraoka; Masao Ishiwata, both of Odawara; Akiji Thunoda, Tokyo, all of Japan

[73] Assignees: Konica Corporation; Hikari Chemical Industry Corporation Limited, both of Tokyo, Japan

[21] Appl. No.: 442,736

[22] Filed: Nov. 28, 1989

[30] Foreign Application Priority Data

Nov. 29, 1988 [JP] Japan .................. 63-301558

[51] Int. Cl.$^5$ .............................................. B32B 7/02
[52] U.S. Cl. ................... 428/213; 428/516; 428/519; 156/244.11; 156/2; 525/240
[58] Field of Search .................. 428/516, 213, 519; 156/244.11; 525/240

[56] References Cited

U.S. PATENT DOCUMENTS

| | | | |
|---|---|---|---|
| 4,331,725 | 5/1982 | Akao | 428/138 |
| 4,337,285 | 6/1982 | Akao et al. | 428/35 |
| 4,386,124 | 5/1983 | Akao | 428/35 |
| 4,411,943 | 10/1983 | Akao et al. | 428/161 |
| 4,411,945 | 10/1983 | Akao et al. | 428/216 |
| 4,436,809 | 3/1984 | Akao et al. | 430/501 |
| 4,469,741 | 9/1984 | Akao | 428/214 |
| 4,513,050 | 4/1985 | Akao | 428/200 |
| 4,778,712 | 10/1988 | Akao | 428/213 |
| 4,876,125 | 10/1989 | Akao et al. | 428/35.2 |

Primary Examiner—Edith L. Buffalow
Attorney, Agent, or Firm—Finnegan, Henderson, Farabow, Garrett, and Dunner

[57] ABSTRACT

A material for packaging light-sensitive materials having a light-shielding film with a thickness of 30–150 μm comprised of a thermoplastic resin containing 5–25 wt % of an ethylene-propylene based rubber having a Mooney viscosity of 10–100 [ML 1+4 (100°C.)] and an iodine value of 20 (I$_2$ g/100 g EPFDM) and 1.2–10 wt % of carbon black.

6 Claims, 1 Drawing Sheet

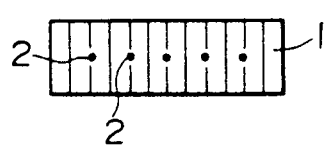
FIG.1
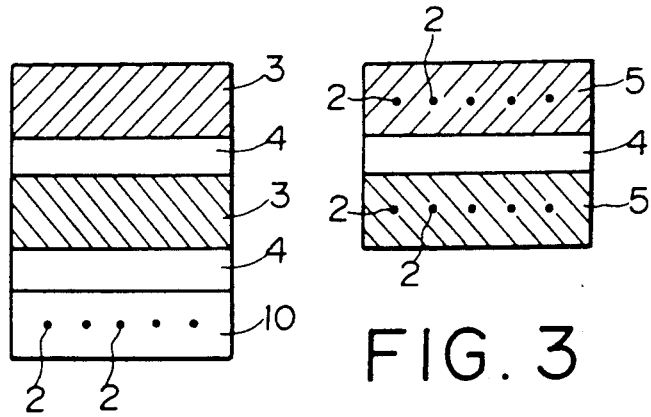
FIG.2
FIG.3
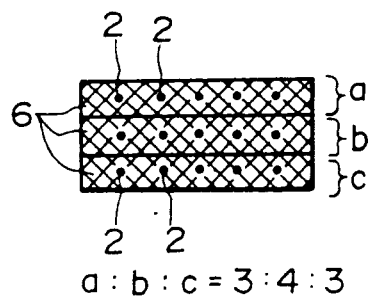
a : b : c = 3 : 4 : 3
FIG.4
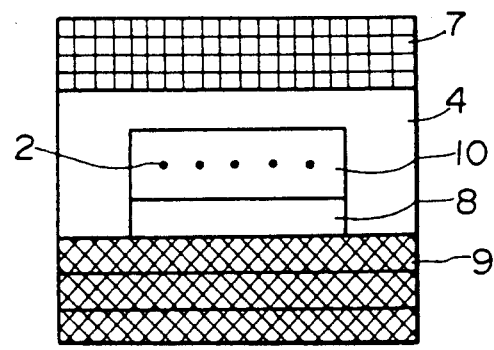
FIG.5

1

MATERIAL FOR PACKAGING LIGHT-SENSITIVE MATERIALS

BACKGROUND OF THE INVENTION

The present invention relates to a material for packaging light-sensitive materials, particularly to one having improved properties such as high physical strength, high degree of light-rightness, ease of bag making and high degree of flatness.

Various materials are currently used for the purpose of packaging light-sensitive materials and typical examples are listed below: films made by blending linear low-density polyethylene (L-LDPE) and low-density polyethylene containing light-shielding materials; two uniaxially drawn films which are superposed in such a way that the drawing direction of one film forms an angle of 30°–90° with that of the other film, with the resulting assembly being laminated with low-density polyethylene on the surface of one side (see Examined Japanese Utility Model Publication No. 56-19087); two uniaxially drawn films of linear low-density polyethylene containing a light-shielding material are superposed in such a way that the drawing direction of one film forms an angle of 30°–90° with that of the other film as described in JP-A-63-121048 (the term "JP-A" as used hereinafter means an "unexamined published Japanese patent application"); and multi-layer coextruded films containing a light-shielding material as described in JP-A-62-18548, JP-A-62-43356, JP-A-62-104247, JP-A-63-1540, JP-A-63-1541, and JP-A-63-53547.

However, these and other prior art materials for packaging light-sensitive materials are not completely satisfactory in that they do not meet all the requirements for such packaging materials. For instance, some of the conventional products lack strength which is one of the most important properties for packaging materials. In order to insure strength, some products have an increased film thickness, but bags cannot be easily made from these products. Other products insure strength by lamination but then the number of steps involved increases making economical production difficult. Yet other products lose light-shielding property when pinholes develop, or they have a low degree of flatness, or their production rate is low on account of the difficulty involved in low-temperature sealing. Under these circumstances, it has been desired to develop an improved material for packaging light-sensitive materials that meet all the requirements for such packaging materials.

SUMMARY OF THE INVENTION

An object, therefore, of the present invention is to provide a material for packaging light-sensitive materials that has high physical strength, that can be sealed at low temperatures, that resists the formation of pinholes, that has good light-shielding property, that can be made into a bag easily, that has a high degree of flatness, and that can be manufactured as a thin film at low cost.

These objects of the present invention can be attained by a material that has at least a light-shielding film with a thickness of 30–150 μm which is made of a thermoplastic resin containing 5–25 wt % of an ethylene-propylene based rubber having a Mooney viscosity of 10–100 [ML 1+4(100° C.)]and an iodine value of no more than 20 ($I_2$ g/100 g EPDM) and 1.2–10 wt % of carbon black.

BRIEF DESCRIPTION OF THE DRAWINGS

FIGS. 1–4 are cross sections of four different lightproof films; and

FIG. 5 is a cross section of a material for packaging light-sensitive materials.

DETAILED DESCRIPTION OF THE INVENTION

The packaging material of the present invention uses a thermoplastic resin that contains an ethylene-propylene based rubber in an amount of 5–25 wt %. This rubber has a Mooney viscosity of 10–100 [ML 1+4 (100° C.)]and an iodine value of no more than 20 ($I_2$ g/100 g EPDM). Mooney viscosity is measured in the present invention by the method described in JIS K 6300 using a rotor of the larger (L) size which is operated for 4 min after 1-min preheating. The test temperature is 100° C. The iodine value represents the contents of unsaturated compounds in an ethylene-propylene copolymer and calculated from the calibration curve after determining the absorption spectra of double bonds with an infrared spectro-photometer. If the Mooney viscosity of the ethylene-propylene based rubber exceeds 100, desired film-casting property is not attained. If the Mooney viscosity is less than 10, sufficient physical strength is not attained. If the iodine value of the ethylene-propylene based rubber exceeds 20, desired film-casting property is not attained. If the content of the ethylene-propylene based rubber is less than 5 wt % of the thermoplastic resin, no improvement is achieved in physical strength. If the content of the rubber exceeds 25 wt %, the resin is too elastic to insure easy processing after it is cast into a film.

The light-shielding film used in the present invention has a thickness of 30–150 μm. If the thickness of this film exceeds 150 μm, the packaging material of the present invention is not easily processable after being cast into a film. If the light-shielding film is thinner than 30 μm, the packaging material cannot be efficiently cast into a film. The amount of carbon black (wt %) to be incorporated in the thermoplastic resin, although this depends upon the thickness of the light-shielding film and the sensitivity of the material to be packaged, must be of such a value that the product of the carbon black content (wt %) and the light-shielding film thickness (μm) is 180 or more, if the material to be packaged is color photographic paper. Thus, carbon black must be added in an amount of at least 1.2 wt % if the thickness of the light-shielding film is 150 μm. If the carbon black content exceeds 10 wt %, the castability of the packaging material and its physical strength will decrease. Therefore, carbon black should be incorporated in the thermoplastic resin in an amount of 1.2–10 wt %, in which range a product having satisfactorly levels of lighttightness, processability and physical strength can be attained.

To further improve the processability of the light-shielding film, it preferably contains a thermoplastic resin that has a reasonable level of rigidity and low-temperature sealability over a broad range of temperatures. Therefore, the light-shielding film preferably contains medium-density polyethylene (MDPE), or a polyethylene having a melt index of 0.01–2.0 g/10 min and a density of 0.931–0.950 g/m³, in an amount of 40–60 wt % of the thermoplastic resin. To further improve its low-temperature sealability and expand the range over which it can be sealed, the thermoplastic resin preferably contains a copolymer of ethylene and an α-olefin having at least 6 carbon atoms, which copolymer has a melt index of 0.1–10 g/10 min and a density of 0.870–0.930 g/cm$^3$. More preferably, this copolymer is incorporated in an amount of 4.5–60 wt %. Many light-shielding films made of thermoplastic resins are joined to other materials (flexible layers) by lamination or some other technique and are thereafter processed into bags of various shapes. If these films are too rigid, the folded portions will recoil to make it difficult to process the films into a bag. If the films are too low in rigidity, they do not have sufficient body to resist the formation of wrinkles in heat-sealed areas and other portions of the bag. Thus, in order to insure efficient processing, the films must have an adequate level of rigidity. Processing into a bag is most commonly performed by heat sealing. If the heat capacity of a heater is the same, a more consistent and rapid processing is possible with resins that can be sealed at lower temperatures. It is therefore desirable to select resins having low-temperature sealability. In mechanical heat sealing, the sealing temperature fluctuates on account of various factors such as the material's heat loss, time lag and overkilling in temperature control. To cope with these problems, a broad range of sealing temperatures is effective since it prevents failure to seal due to insufficient temperatures or destruction of the resin due to excessive temperatures which will lead to the development of pinholes and other defects that result in poor light shielding or insufficient strength.

Materials for packaging light-sensitive materials are conventionally composed of a strength layer, a light-shielding layer and a heat sealed layer. A light-shielding layer is usually a laminate of two or more layers since pinholes are liable to develop on account of gelation of resins (i.e., destruction of unmelted granules). However, in order to obtain a thin material for packaging light-sensitive materials, the constituent three layers described above are preferably superposed one upon another. This is accomplished in the packaging material of the present invention by multi-layer coextrusion. In order to prevent the occurrence of pinholes, at least two constituent layers of the packaging material need to contain carbon black. Multi-layer coextrusion is a technique commonly employed in extrusion molding of films, sheets, pipes and other shapes. In extrusion molding, a molding material supplied from a hopper is heated in an extruding machine and the molten feed is continuously extruded from a die by means of a screw. In multi-layer coextrusion, different molding materials are supplied from two or more hoppers to a corresponding number of independent dies. In the present invention, multi-layer coextrusion blow molding is performed using a three-layered ring die with annular slits.

Since light-sensitive materials of various sizes are to be packaged by the material of the present invention, blow or inflation molding which permits easy change in film width is not only economical but also effective. In inflation molding, a molten feed is extruded from a ring die having an annular slit and the extruded tube is supplied with a given amount of air until it is inflated to a predetermined size. The tubular film is then wound up continuously. The technique has the advantage that the film width can be varied over a fairly broad range by merely changing the amount of air to be blown. Another advantage of inflation molding is that the tubular film produced can be readily shaped into a bag by merely heat sealing one edge thereof.

The packaging material of the present invention comprises several basic resins. In the prior art, all of the constituent resins are melted before extrusion but this is not cost-effective since an increased number of steps are involved. Thus, according to the present invention, an extruding machine in which the ratio of L (extrusion length) to D (screw diameter) of at least 24 is employed so that the feed is slowly extruded over a prolonged time. By so doing, individual constituent resins can be mixed together and yet their dispersibility and flowability are good enough to insure the production of a packaging material that can be cast into a film with high efficiency.

The following examples are provided for the purpose of further illustrating the present invention but are in no way to be taken as limiting.

EXAMPLE 1

Preparation of samples

Sample 1: Ethylene-propylene based rubber (A), L-LDPE (B), MDPE (C) and furnace carbon black were mixed in the proportions shown in Table 1 and extruded to prepare a light-shielding film (sample No. 1) 100 μm thick that had three layers 6 of the same composition superposed one on another as shown in FIG. 4. The extruder was a multi-layer extruding machine having an L/D ratio of at least 24.

Samples 2–5: These samples were prepared in the same way as described above except that the types of resins mixed and the proportions of their mixing were changed as shown in Table 1. Comparative sample 1: LDPE (D), L-LDPE (B) and furnace carbon black were mixed in respective proportions of 58.0 wt %, 38.0 wt % and 4.0 wt %, and extruded to prepare a single-layered light-shielding film 1 with thermoplastic resins and a light shielding substance 2 such as carbon black as shown in FIG. 1. This film had a thickness of 80 μm.

Comparative Sample 2: As shown in FIG. 2, two HDPE (E) layers 3 oriented at 45° were laminated with an LDPE layer 10 μm thick in such a way that the direction of orientation in one HDPE layer would be opposite to the direction of orientation in the other HDPE layer. Then, an LDPE (F) film 10, 60 μm thick that contained 4.0 wt % of furnace carbon black was laminated with a 15-μm thick LDPE layer 4 to prepare Comparative Sample No. 2.

Comparative Sample 3: As shown in FIG. 3, two resin layers 5 each consisting of 26.0 wt % of L-LDPE (G), 70.0 wt % of HDPE (E) and 4.0 wt % of furnace carbon black were oriented at 45° and laminated with a 10-μm thick LDPE layer 4 in such a way that the direction of orientation in one resin layer would be opposite to the direction of orientation of the other resin layer to prepare Comparative Sample No. 3.

The densities, melt indices, Mooney viscosities, iodine values and other necessary information of the resins (A - G, A' and A") used to prepare the respective samples are shown in Table 2.

TABLE 1

| Sample 1 | Ethylene-propylene based rubber (A) | 10.0 wt % |
|---|---|---|
| | L-LDPE (B) | 43.0 wt % |
| | MDPE (C) | 43.0 wt % |
| | Furnace carbon black | 4.0 wt % |
| Sample 2 | Ethylene-propylene based rubber (A') | 10.0 wt % |
| | L-LDPE (B) | 43.0 wt % |
| | MDPE (C) | 43.0 wt % |
| | Furnace carbon black | 4.0 wt % |
| Sample 3 | Ethylene-propylene based rubber (A") | 10.0 wt % |

TABLE 1-continued

| | |
|---|---|
| L-LDPE (B) | 43.0 wt % |
| MDPE (C) | 43.0 wt % |
| Furnace carbon black | 4.0 wt % | and evaluated by the following criteria: ◯, less than 0.1 % (good); Δ, from 0.1% to less than 1% (fair); X, 1% and higher (unacceptable). The results of these evaluations are shown in Table 3.

TABLE 3

| | Unit | Sample 1 | Sample 2 | Sample 3 | Sample 4 | Sample 5 | Comparative Sample 1 | Comparative Sample 2 | Comparative Sample 3 | Test method |
|---|---|---|---|---|---|---|---|---|---|---|
| Thickness of light-shielding film | μ | 100 | 100 | 100 | 100 | 100 | 100 | 165 | 100 | JIS P8118 |
| Tear strength MD[1] | g | ◯ 1920 | ◯ 1730 | Δ 1150 | ◯ 2080 | Δ 1200 | X 350 | ◯ 1770 | ◯ 2300 | JIS P8116 |
| TD[2] | | ◯ 2770 | ◯ 2500 | Δ 2200 | ◯ 3100 | Δ 2250 | Δ 2000 | ◯ 2670 | ◯ 2600 | |
| Impact strength | g | ◯ 1000 | ◯ 910 | Δ 750 | ◯ 1100 | Δ 820 | X 530 | ◯ 1040 | ◯ 1100 | JIS K7124 |
| Rigidity | gf-cm | 0.83 | 0.80 | 0.78 | 1.10 | 0.70 | 0.50 | 1.48 | 0.97 | JIS P8125 |
| Flatness | — | ◯ | ◯ | ◯ | Δ | ◯ | ◯ | ◯ | Δ | — |
| Dynamic frictional coefficient | — | ◯ 0.36 | ◯ 0.36 | ◯ 0.35 | ◯ 0.40 | ◯ 0.28 | X 0.12 | X 0.58 | ◯ 0.30 | JIS K7125 |
| No. of steps involved | | 1 | 1 | 1 | 1 | 1 | 1 | 4 | 2 | — |
| Range of sealing temperatures | °C. | ◯ 190~260 | ◯ 190~260 | ◯ 190~260 | Δ 220~260 | ◯ 180~260 | ◯ 200~260 | X 250~280 | Δ 220~260 | *1 |
| Ease of bag making | — | ◯ | ◯ | ◯ | Δ | ◯ | X | X | ◯ | |

Note [1]MD, force applied in the direction of flow (i.e., the direction of resin advance in film making).
Note [2]TD, force applied in a direction perpendicular to the direction of flow.
*1: After heat sealing at 3.5 kg for 2 seconds, temperature was varied and evaluation was made in accordance with JIS P 811 (tensile strength test).

| | | |
|---|---|---|
| Sample 4 | Ethylene-propylene based rubber (A) | 25.0 wt % |
| | L-LDPE (B) | 28.0 wt % |
| | MDPE (C) | 43.0 wt % |
| | Furnace carbon black | 4.0 wt % |
| Sample 5 | Ethylene-propylene based rubber (A) | 5.0 wt % |
| | L-LDPE (B) | 48.0 wt % |
| | MDPE (C) | 43.0 wt % |
| | Furnace carbon black | 4.0 wt % |

TABLE 2

| Designation | Resin | Density (g/cm³) | MI (g/10 min) | Remarks |
|---|---|---|---|---|
| A | ethylene-propylene based rubber | 0.86 | — | Mooney viscosity, 90 Iodine value, 15 |
| B | L-LDPE | 0.915 | 1.0 | α-olefin 4-methyl-1-pentene |
| C | MDPE | 0.945 | 0.024 | — |
| D | LDPE | 0.924 | 2.0 | — |
| E | HDPE | 0.955 | 0.04 | — |
| F | LDPE | 0.924 | 0.8 | — |
| G | L-LDPE | 0.920 | 2.1 | α-olefin 4-methyl-1-pentene |
| A' | ethylene-propylene based rubber | 0.86 | — | Mooney viscosity, 65 Iodiane value, 15 |
| A'' | ethylene-propylene based rubber | 0.86 | — | Mooney viscosity, 10 Iodine value, 0 |

MI: melt indices

Measurements

The tear strength, impact strength, rigidity and dynamic frictional coefficient of samples 1-5 and comparative samples 1-3 were measured by the methods described in JIS (for specific JIS numbers, see Table 3). Flatness of each sample was checked visually and evaluated by the following criteria: ◯, flat (good); Δ, fine granules, wrinkles and other signs of non-flatness were visible (fair); X, signs of non-flatness were conspicuous (unacceptable). The range of sealing temperatures was such that a seal strength of 2.0 kg/15 cm and higher could be achieved. Ease of bag making was checked by measuring the percentage of bags occupied by rejects As shown in Table 3, the samples of the present invention could be prepared in one step without requiring lamination. In contrast, comparative sample No. 2 required as many as four steps to prepare. Further, the samples of the present invention exhibited good balance between various properties which were evaluated at least "fair". Particularly good results were attained with sample Nos. 1 and 2.

EXAMPLE 2

Preparation of samples

As shown in FIG. 5, a sheet of Clupack paper (73 g/m²) 7 was laminated with a LPDE film 9 and an LDPE film 10 30 μm thick that was slightly smaller in width than the Clupack paper and which contained furnace carbon black. Light shielding film 9 is adhered to film 4 at edges not covered by LPDE film 10, as shown in FIG. 5. A space 8 is formed between LPDE film 10 and light shielding film 9. At the same time, the edges of sample No. 1 prepared in Example 1 were laminated to fabricate sample 1'. This sample had a double-layered barrier with a space in the middle.

Similarly, samples 2'-5' and comparative samples 1'-3' were prepared using samples 2-5 and comparative samples 1-3, respectively, in place of sample 1.

Clupack paper is commercially available and one manufactured by Tokai Pulp CO., Ltd. or Daiko Paper Mfg. Co., Ltd. was used in Example 2.

Measurements

The rigidity, dynamic frictional coefficient and other properties of samples 1'-5' and comparative samples 1'-3' were measured by the methods described in JIS (for specific JIS numbers, see Table 4).

The vibration test, failing test and the carbon adhesion test were conducted to simulate the conditions in which packaged light-sensitive materials would be in the process of market distribution. For example, in the vibration and failing tests, color papers were put into sample packages, exposed to 10⁵ lux light for 3 h, developed and evaluated for the light-shielding property of the packages by checking the sensitivity and photographic characteristics of the color papers. Carbon adhesion was investigated by the following procedure; color papers rolls with a glossy surface facing outside were put into sample bags and subjected to vibration and falling tests; thereafter, check was made to see whether carbon adhered to the outermost surface of color paper rolls which was in contact with the inside surface of the bags.

The range of sealing temperatures, flatness and ease of bag making were evaluated as in Example 1.

The results of these measurements and evaluations are shown in Table 4.

TABLE 4

|  | Unit | Sample 1' | Sample 2' | Sample 3' | Sample 4' | Sample 5' | Comparative Sample 1' | Comparative Sample 2' | Comparative Sample 3' | Test method |
|---|---|---|---|---|---|---|---|---|---|---|
| Thickness | μ | 250 | 250 | 250 | 250 | 250 | 250 | 320 | 250 | JIS P8118 |
| Rigidity | gf · cm | ◯ 3.01 | ◯ 2.90 | ◯ 2.85 | Δ 4.75 | ◯ 2.80 | X 1.87 | X 9.10 | ◯ 3.88 | JIS P8125 |
| No. of steps involved |  | 2 | 2 | 2 | 2 | 2 | 2 | 5 | 3 | — |
| Range of sealing temperatures | °C. | ◯ 190~260 | ◯ 190~260 | ◯ 190~260 | Δ 220~260 | ◯ 180~260 | ◯ 200~260 | X 250~280 | Δ 200~260 | *1 |
| Flatness | — | ◯ | ◯ | ◯ | Δ | ◯ | ◯ | ◯ | Δ | — |
| Ease of bag making | — | ◯ | ◯ | ◯ | Δ | ◯ | X | X | ◯ | — |
| Dynamic frictional coefficient | — | ◯ 0.36 | ◯ 0.36 | ◯ 0.35 | ◯ 0.40 | ◯ 0.28 | X 0.12 | X 0.58 | ◯ 0.30 | JIS K7125 |
| Vibration test | — | ◯ | ◯ | ◯ | ◯ | ◯ | X | ◯ | ◯ | JIS Z0232 |
| Falling test | — | ◯ | ◯ | ◯ | ◯ | ◯ | X | ◯ | ◯ | JIS Z0202 |
| Carbon adhesion | — | ◯ | ◯ | ◯ | Δ | ◯ | ◯ | X | ◯ | JIS Z0232 JIS Z0202 |

*1: After heat sealing at 3.5 kg for 2 seconds, temperature was varied and evaluation was made in accordance with JIS P 811 (tensile strength test).

As shown in Table 4, the samples of the present invention could be prepared in two steps without requiring lamination. In contrast, comparative sample 2' required as many as five steps to prepare. Further, all samples of the present invention except No. 4' exhibited a very good balance between various properties which were evaluated "good". Even sample No. 4' exhibited good balance between properties in spite of the fact that it was evaluated "fair" in five aspects.

Consequently, the present invention could provide materials for packaging light-sensitive materials that had high physical strength, that could be sealed at low temperatures, that resisted the formation of pinholes, that had good light-shielding property, that could be made into bags easily, that had a high degree of flatness, and that could be manufactured as thin films at low cost.

What is claimed is:

1. A light shielding film material having a thickness of 30-150 μm for packaging light-sensitive materials comprising a thermoplastic resin containing:

5-25 wt % of an ethylene-propylene based rubber having a Mooney viscosity of 10-100 (ML 1+4 (100° C.)) and an iodine value of not more than 20 ($I_2$ g/100 g EPDM);

40-60 wt % of a medium density polyethylene having a melt index of 0.01-2.0 g/10 min and a density of 0.931-0.950 g/cm$^3$;

a copolymer of ethylene and an α-olefin having at least 6 carbon atoms, a melt index of 0.1-10 g/10 min and a density of 0.8.70-0.930 g/cm$^3$; and 1.2-10 wt % of carbon black.

2. A material for packaging light-sensitive materials according to claim 1 wherein said copolymer is included in said thermoplastic resin in an amount of 4.5-65 wt %.

3. A material for packaging light-sensitive materials according to claim 1 wherein said light-shielding film is produced by multi-layer coextrusion and contains carbon black in at least two layers.

4. A material for packaging light-sensitive materials according to claim 1 wherein said light-shielding film has at least three layers superposed one on another by multi-layer coextrusion.

5. A material for packaging light-sensitive materials according to claim 3 wherein said multi-layer coextrusion is performed by an inflation technique using a three-layered ring die having annular slits.

6. A material for packaging light-sensitive materials according to claim 3 wherein said multi-layer coextrusion is performed by an inflation technique using an extruding machine with an L/D ratio being at least 24, L being the extrusion length and D being the screw diameter.

* * * * *

UNITED STATES PATENT AND TRADEMARK OFFICE
CERTIFICATE OF CORRECTION

PATENT NO. : 5,055,344
DATED : October 8, 1991
INVENTOR(S) : Naohito Naraoka, et. al.

It is certified that error appears in the above-indentified patent and that said Letters Patent is hereby corrected as shown below:

Title page, item [57], Abstract, line 6, change "EPFDM" to --EPDM--.

Column 8, Claim 1, line 10, change "0.8.70" to --0.870--.

Signed and Sealed this

Twenty-sixth Day of April, 1994

Attest:

BRUCE LEHMAN

*Attesting Officer*     *Commissioner of Patents and Trademarks*